United States Patent [19]

Ionescu et al.

[11] Patent Number: 4,610,237

[45] Date of Patent: Sep. 9, 1986

[54] IGNITION CIRCUIT, ESPECIALLY FOR MAGNETO-TRIGGERED INTERNAL COMBUSTION ENGINES

[75] Inventors: Dragos Ionescu, New York; Mihai Soiman, Woodside, both of N.Y.

[73] Assignee: Wedtech Corp., Bronx, N.Y.

[21] Appl. No.: 704,011

[22] Filed: Feb. 21, 1985

[51] Int. Cl.[4] .............................................. F02P 3/08
[52] U.S. Cl. ...................... 123/600; 123/602
[58] Field of Search ............. 123/599, 600, 601, 602

[56] References Cited

U.S. PATENT DOCUMENTS

| | | | |
|---|---|---|---|
| 3,504,658 | 4/1970 | Chavis | 123/604 |
| 3,747,582 | 7/1973 | Kato | 123/599 |
| 3,861,372 | 1/1975 | Shibukawa et al. | 123/602 |
| 3,863,616 | 2/1975 | Wood | 123/602 X |
| 3,941,110 | 3/1976 | Sekiguchi | 123/599 |
| 4,132,208 | 1/1979 | Yukawa | 123/602 |
| 4,335,692 | 6/1982 | Miura | 123/602 X |
| 4,342,304 | 8/1982 | Watanabe | 123/599 |
| 4,380,224 | 4/1983 | Van Siclen, Jr. | 123/602 |

*Primary Examiner*—Tony M. Argenbright
*Attorney, Agent, or Firm*—Karl F. Ross; Herbert Dubno

[57] ABSTRACT

An electronic ignition circuit for a magneto engine utilizes a nonlinear network which responds to the low voltage signal developed in the magneto to control an electronic switch triggering the discharge of a capacitor through a high voltage coil for firing the spark plug so that the system provides automatic advance by virtue of the shift in response to the magneto signal in the nonlinear circuit.

8 Claims, 4 Drawing Figures

IGNITION CIRCUIT, ESPECIALLY FOR MAGNETO-TRIGGERED INTERNAL COMBUSTION ENGINES

FIELD OF THE INVENTION

Our present invention relates to an ignition circuit for small engines and especially for magneto-triggered internal combustion engines. More particularly, the invention relates to an electronic ignition circuit with automatic advance control for such engines.

BACKGROUND OF THE INVENTION

Small internal combustion engines comprise a magneto for generating the impulse which triggers the ignition in those cylinders in which compression of the fuel/air mixture has occurred. In early design of such engines, the electrical pulse generated by the magneto, i.e. the magnet/coil assembly which was relatively rotated by the shaft of the engine, fired the spark plugs in appropriate order with a pulse which was increased by the action of breaker points and a voltage multiplying coil and with firing control by mechanical factors such as the offsetting of the various parts of the ignition system with respect to one another. The "advance of the spark required for increased speeds was effected by mechanically moving an element of the firing system.

These systems eliminate the need for a battery or other source of electrical energy and hence use of magneto engines has found widespread application, namely for small engines with outputs below, say, 100 hp and in a wide variety of sizes and uses.

In recent years efforts have been made to develop electronic ignition systems utilizing magneto input and, especially, electronic switching to eliminate the breaker points which have created reliability problems in the past, especially for military and government applications where the engines must conform to extremely rigid performance specifications.

While such electronic ignition systems have been developed in the past, they, too, are generally not very reliable and it is not uncommon, upon the purchase of a large number of self-contained electronic ignition control systems, even when they are purported to comply with government and military specifications, that a substantial proportion do not perform up to these standards, are inoperative, and require replacement. Customarily a magneto-type triggering is provided in addition to a magneto-type supply of the spark-firing current.

OBJECTS OF THE INVENTION

It is the principal object of the present invention to provide an improved ignition system, especially for such small engines, and for magneto-operated engines, generally which will obviate the drawbacks heretofore described.

It is another object of our invention to provide electronic ignition systems which eliminate entirely the triggering coils heretofore required in magneto systems for the actual firing of the discharges at the spark plugs and the disadvantages associated with the use of such coils, namely the shifts and operating points resulting from changes in operating conditions.

It is also an object of the invention to eliminate problems encountered with the mechanical spark advance.

Still another object of the invention is to provide a highly reliable reproducible and easily manufactured ignition system of compact design, utilizing relatively simple and readily available components, which is of low cost, which is applicable to practically all magneto-operated engines, and which has excellent stability over a wide speed range and operating temperature range.

SUMMARY OF THE INVENTION

We have now discovered that it is possible to utilize the coil which has been employed heretofore for the low voltage current generation also as a trigger control by providing a nonlinear electronic network as an advance control circuit between this coil and a triggerable element which discharges a capacitor through transformer coils connected to the respective spark plugs, and thereby eliminate the disadvantages outlined above of conventional magneto ignition system and even the electronic ignition systems which have been tied to magneto inputs in the past.

Basically, therefore, the ignition system of the invention comprises a capacitor charging network which is connected to the low voltage magneto coil of the engine and which charges a capacitor for the spark plug or group of spark plugs to be fired, a triggering circuit connected between this capacitor and the spark plugs to be fired simultaneously, the triggering circuit having a control element, and the nonlinear network previously mentioned which is independently fed by the magneto and the response to the slope of the voltage rise curve thereof in requisite nonlinear fashion automatically to trigger the circuit or network to the appropriate point to discharge the capacitor and hence fire the spark plug.

With our invention, therefore, the necessary advance is detected by shifting the response of the nonlinear network in accordance with the change in the slope of the voltage rise curve to the magneto, this signaling a shift in the speed requiring greater or less timing advance. When reference is made to the slope of the voltage rise curve, it should be understood that either arm of the voltage pulse generated by the magneto may be used for the purposes of the present invention.

A voltage-limiting network can be included in the charging side circuit of the capacitor and the triggering network or circuit can include a thyristor, SCR or some other triggerable switching element with a fast response time, such as a MOSFET.

DESCRIPTION OF THE DRAWING

The above and other objects, features and advantages of the present invention will become more readily apparent from the following description, reference being made to the accompanying drawing, in which.

SPECIFIC DESCRIPTION

Figure 1:
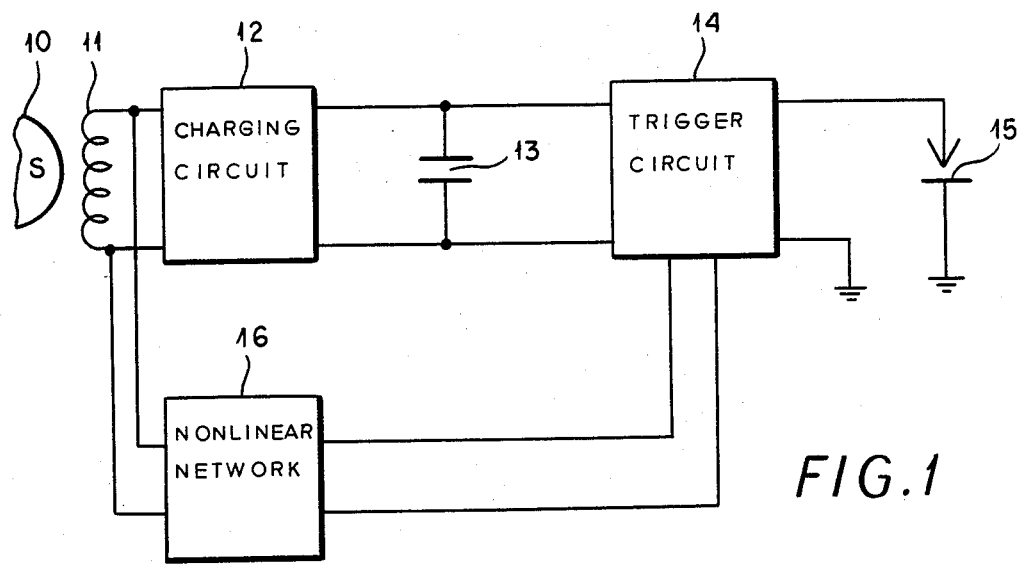
FIG. 1 represents in block diagram form the essential elements of a magneto circuit according to the invention.

From FIG. 1, it will be apparent that the internal combustion engine can have a magneto whose permanent magnet 10 is only partly illustrated in FIG. 1 and cooperates with a magneto coil, only the low voltage portion of which is used in accordance with the invention. This coil has been represented at 11 in FIG. 1.

The rectified voltage from this coil is applied by a charging circuit or network 12 to a capacitor 13 so that the ignition circuit of the invention can be considered a condenser discharge ignition circuit. The discharge or trigger circuit has been represented at 14 and feeds a high voltage pulse to a spark plug 15 when it receives a triggering input from a nonlinear network 16 responsive to the shape of the voltage developed at the coil 11.

Since the nonlinear network has a logarithmic response, a change in the wave form to the magneto coil 11 will shift the response of the nonlinear network along the logarithmic characteristic thereof and thus trigger the circuit 14 with an appropriate shift in advance representing the speed of the engine since the magneto waveform is speed-responsive.

Figure 2:
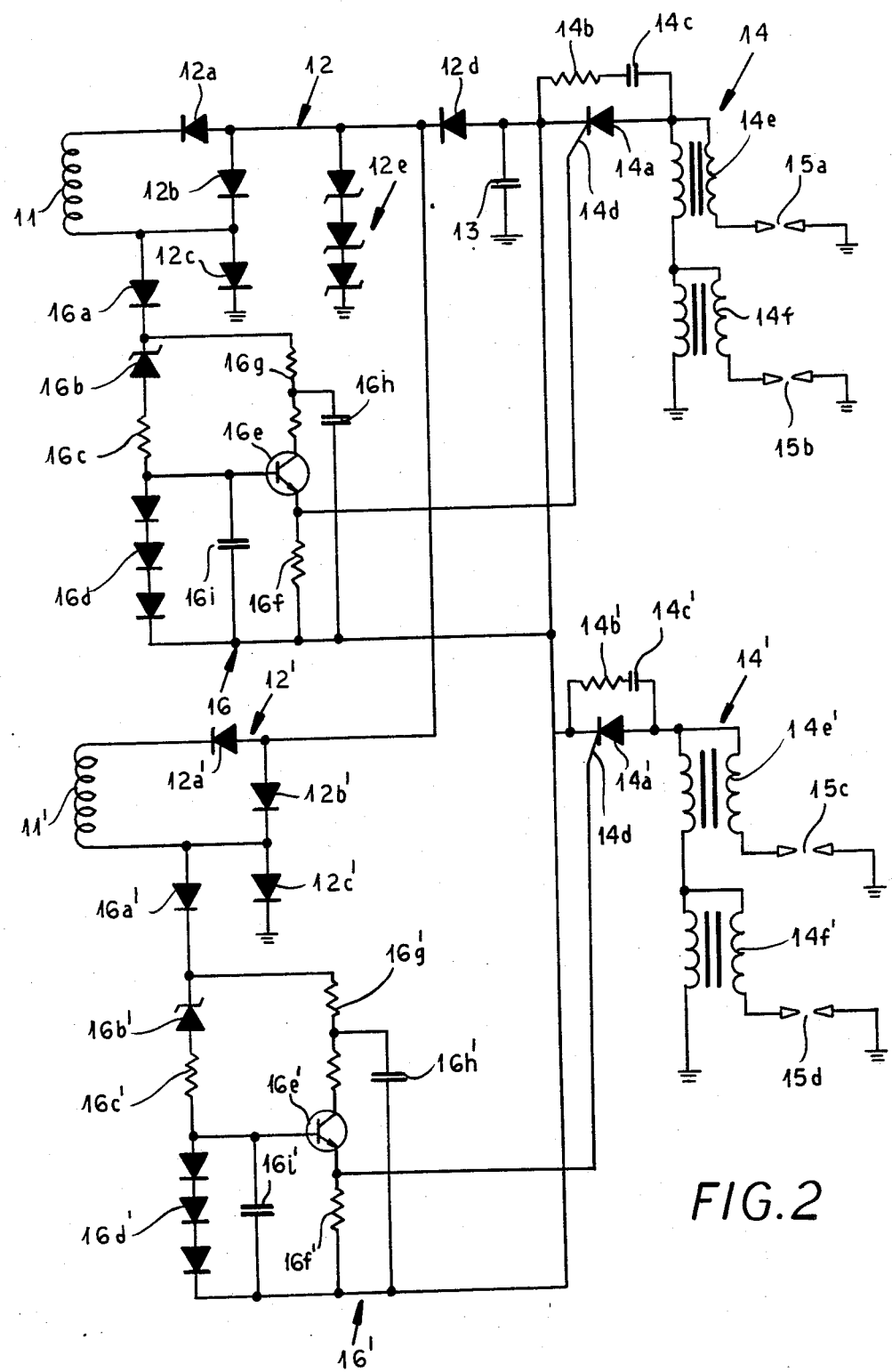
FIG. 2 is a detailed circuit diagram of this system as applied to a cylinder magneto-operated engine according to the invention.

Referring now to FIG. 2, which illustrates a practical embodiment of the circuit shown in FIG. 1, it can be seen that the magneto coil 11 is connected to a charging network 12 which includes rectifier diodes 12a, 12b and 12c connected so as to rectify the signal delivered to the condenser 13. A reverse blocking diode 12d likewise forms part of the charging circuit, as does a cascaded Zener diode 12e forming a voltage limiter for the charging signal.

The triggering network 14 comprises a rapid response electronic switch, here shown as a thyristor 14a which is bridged by a quenching circuit consisting of a resistor 14b and a capacitor 14c and has its gate 14d connected to the nonlinear circuit 16 as will be described. The triggering circuit also comprises a pair of spark coils 14e and 14f for the two spark plugs 15a and 15b of two cylinders of the engine which can be fired simultaneously in accordance with conventional practices with magneto engines, one of these cylinders being in the compression phase while the other may be in an exhaust phase in which the discharge of the spark plug has no adverse effect.

When a 4-cylinder engine is used, the spark plugs 15c and 15d which are to be fired at a time offset from the spark plugs 15a and 15b are provided with spark coils 14e' and 14f' of a duplicate trigger circuit 14 whose thyristor 14a' has its gate 14d' triggered by the nonlinear circuit 16'. A quenching circuit consisting of a resistor 14' and a capacitor 14c' bridges the power electrodes of the thyristor 14a'.

The charging circuit 12' here works into the condenser 13 in the manner already described and includes a respective magneto coil 11' and a corresponding rectifier diode array 12a', 12b' and 12c.

In the embodiment illustrated, the nonlinear circuit operates on the trailing flank of the charging pulse, this signal being applied in the nonlinear network via a diode 16a or 16a' to the nonlinear network formed by a Zener diode 16b, 16b' in series with a resistor 16c, 16c' and the emitter by its resistor 16f, 16f' thereof across which the trigger signal for the respective thyristor is tapped.

The trigger circuits are completed by a voltage divider 16g or 16g' which is tapped via a condenser 16h, 16h' to the connection between the resistor 16f, 16f' and the respective diode cascade. Condenser 16i or 16i' is connected in the base emitter network as well.

It will be apparent, therefore, that as each magnet of the rotor passes the respective coil a rectified signal charges the condenser. Note that the rectifiers of the charging circuits are poled negatively toward the capacitor because of the conventional response desired although an opposite polarity operation will be effective as well.

Depending upon the speed, the nonlinear circuit responds to render the respective transistor 16e and 16e' conductive at the apropriate points and thereby trigger the thyristor 14a or 14a' so that the capacitors discharge through the respective coils and fire the respective plugs.

While the circuit has certain obvious advantages because of its simplicity, fewer components and hence increased reliability, it should be noted that we have found that the entire assembly illustrated in FIG. 2, including the spark coils and the leads running to the spark plugs and, of course, the leads running to the magneto coils can be put up in a housing which is a fraction of the size of the electronic ignition systems now available for such magneto-operated engines. The triggering coils associated with the magneto are eliminated entirely. The nonlinear circuit provides electronic advance control with high precisions of the firing between cylinders. The firing power available at low speeds is high and the engine starting is easier under practically any condition. Electrically, the apparatus spans a wide range of speed stability and thermal stability.

Figure 3:
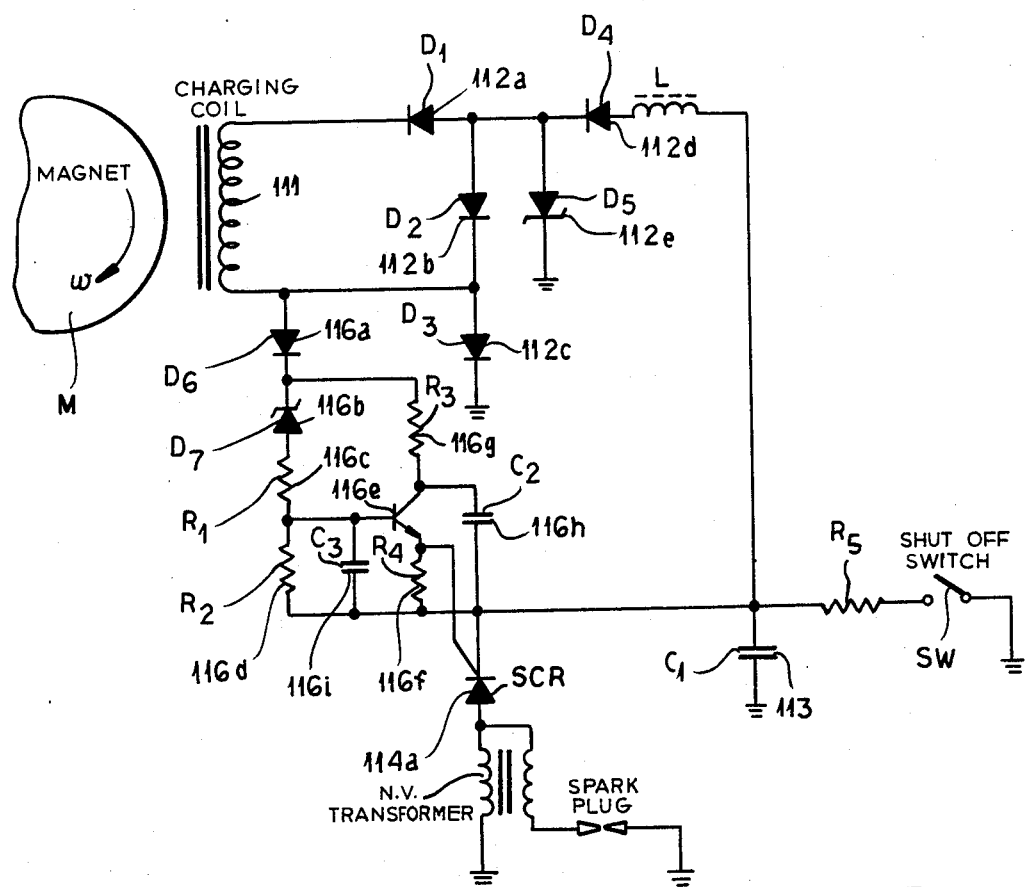
FIG. 3 is a circuit diagram of another electronic ignition module with logarithmic advance for a magneto system according to the invention.

In FIG. 3 the magnet M of the magneto induces a current in the charging coil 111 whose half-wave rectifier consists of the diodes 112a, 112b, 112c represented as diodes $D_1$, $D_2$, $D_3$ respectively. As in FIG. 2, a Zener diode 112e and a reversely poled rectifier diode 112d are provided as diodes $D_4$ and $D_5$. Diodes $D_1$–$D_4$ are of type IN 5420 and diode $D_5$ is an IN 4989.

We have found that it is desirable to provide a saturable inductor L with an inductance of the order of 50 $\mu$H with the effect of improving the discharge characteristics.

The nonlinear network 116a, 116b, 116c consists of a rectifier diode $D_6$ (IN 5619), a Zener diode $D_7$ and the resistor $R_1$ (10 k $\Omega$), while a resistor 116g ($R_3$ of 47 k $\Omega$) is connected to the collector of the transistor 116e (ZN635A).

As in FIG. 2, a capacitor 116h ($C_2$ of 0.47 $\mu$F) is also connected to the collector while a bus resistor 116f ($R_4$ of 470 $\Omega$) is connected to the emitter and the base circuit of the transistor includes a resistor 116d ($R_2$ of 180 $\Omega$) in parallel with a capacitor 116i ($C_3$ of 1 $\mu$F).

The SCR 114a (C106M) is connected as in FIG. 2. However the nongrounded terminal of the storage capacitor 113 ($C_1$ of 5 $\mu$F) is here connected through a resistor $R_5$ (15 $\Omega$) to ground by a grounding switch SW.

The operation of this circuit is identical to that of FIG. 2.

Figure 4:
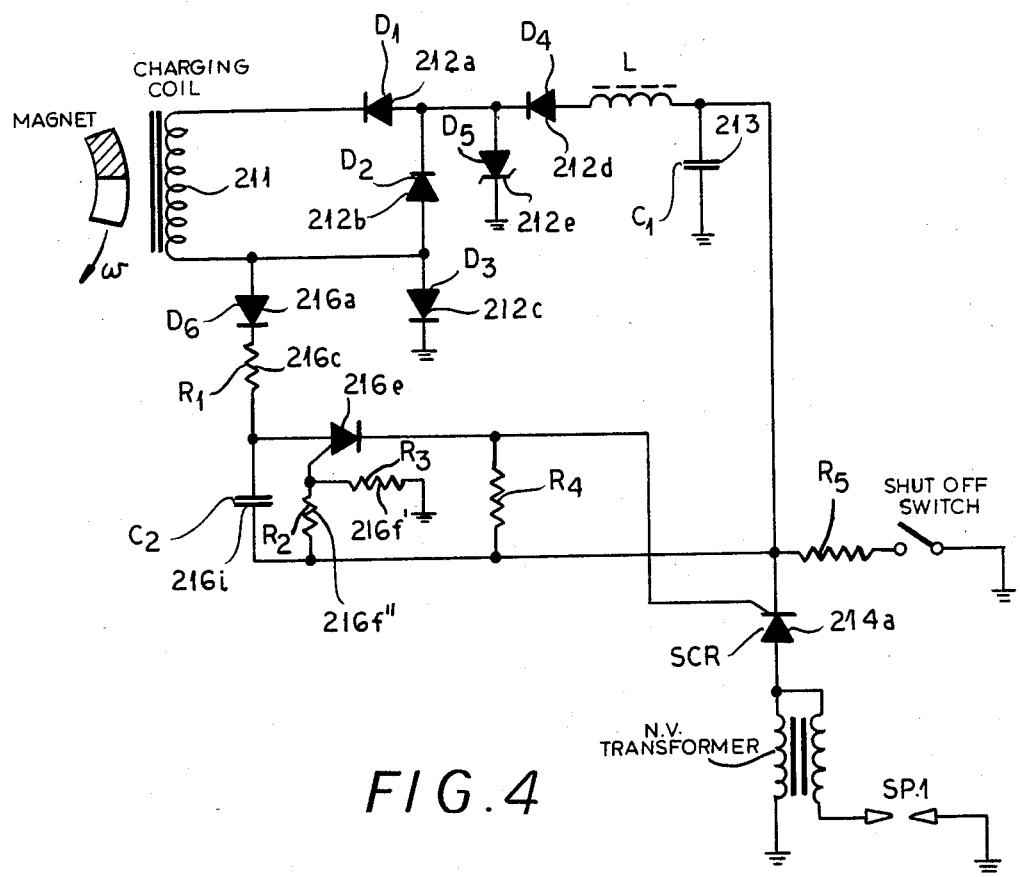
FIG. 4 is a circuit diagram of a similar system using a unijunction transistor in the triggering of the discharge through the spark coil or transformer.

FIG. 4 shows the use of a unijunction transistor in accordance with the invention. In this circuit, elements 211, 212a–212e, 216a, 213, L, 214a, $R_5$ and SW are identical to those with corresponding reference characters in FIG. 3. Here the nonlinear circuit is formed by a resistor 216c and a condenser 216i connected to one side of a unijunction transistor 216e whose gate is tied to the resistors 216f' and 216f''. A bias resistor 216f is also provided. In practice this circuit also operates similarly.

We claim:

1. An electronic ignition system for an internal combustion engine having at least one spark plug and a magneto having at least one magneto coil with a single low-voltage winding in said coil, said system comprising:
- a charging circuit connected to said winding and providing a rectified output;
- a discharge condenser continuously connected to said charging circuit and adapted to be charged by said output;
- a triggering circuit including:
  - an electronic switch having a control electrode, and
  - a high voltage transformer connectable by said switch, when said switch is triggered to said condenser,
  - said sprak plug being connected to said transformer for firing when said switch is triggered by said control electrode; and
- a nonlinear network connected to said winding and logarithmically responsive to a signal generated therein for triggering said control electrode to effect a discharge of said condenser through said transformer to fire said spark plug whereby a firing point is automatically advanced and retarded depending upon the logarithmic response of said nonlinear network, said nonlinear network consisting essentially of:
  - a blocking diode connected to said winding at one side of said blocking diode,
  - a transistor having a base connected to another side of said blocking diode and two principle electrodes,
  - a series network of a Zener diode and a resistor interposed between said other side of said blocking diode and said base, and across said base and one of said principal electrodes of said transistor, and
  - means including a load resistor in series with the other of said principal electrodes for directly tapping a signal across said resistor and applying it directly to said control electrode for triggering of said switch.

2. The electronic ignition system defined in claim 1 wherein a diode cascade in parallel with a condenser is connected to one terminal of said load resistor, another terminal of said load resistor being connected to said other principal electrode and said control electrode, a junction between said blocking diode and said Zener diode being connected to said one of said principal electrodes by a voltage divider, and a tap of said voltage divider being connected to said one terminal of said load resistor.

3. The electronic ignition system defined in claim 1 wherein a junction between the blocking diode and said Zener diode is connected to said one principal electrode of said transistor by a resistor, said one principal electrode of said transistor is connected to one terminal of said load resistor through a condenser, another terminal of said load resistor forming a junction with said other principal electrode and being connected to said control electrode, a further resistor being connected in parallel with a condenser between said base and said one terminal of said load resistor.

4. The electronic triggering system defined in claim 1 wherein a respective such transformer is provided for each of a pair of spark plugs of said engines to be fired simultaneously.

5. The electronic triggering system defined in claim 4 wherein said engine has a plurality of pairs of spark plugs to be fired simultaneously, each of said pairs being assigned a respective said charging circuit, a respective triggering circuit, and a respective said nonlinear network.

6. The electronic triggering system defined in claim 1 wherein said charging circuit, said triggering circuit and said network are brought into a common housing.

7. The electronic triggering system defined in claim 1, further comprising a grounding switch connected to said condenser for cutting off ignition.

8. The electronic triggering system defined in claim 1, further comprising an inductor connected between said discharge condenser and said charging circuit.

* * * * *